United States Patent
Watson et al.

(10) Patent No.: US 6,212,382 B1
(45) Date of Patent: *Apr. 3, 2001

(54) METHOD FOR HANDOVER IN MULTICELLULAR ENVIRONMENT

(75) Inventors: Andrew Watson, Bachford Bath; Jonathan Hopkinson, Corsham Wiltshire, both of (GB)

(73) Assignee: Motorola, Inc., Schaumburg, IL (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/817,043
(22) PCT Filed: Sep. 28, 1995
(86) PCT No.: PCT/EP95/03846
§ 371 Date: Jul. 14, 1997
§ 102(e) Date: Jul. 14, 1997
(87) PCT Pub. No.: WO96/10893
PCT Pub. Date: Apr. 11, 1996

(30) Foreign Application Priority Data

Oct. 4, 1994 (GB) .................................................. 9420002

(51) Int. Cl.[7] ...................................................... H04Q 7/08
(52) U.S. Cl. .......................... 455/444; 455/437; 455/440; 455/443
(58) Field of Search .................................... 455/435, 436, 455/439, 443, 444, 437, 449, 422, 441, 442, 440

(56) References Cited

U.S. PATENT DOCUMENTS

| | | | |
|---|---|---|---|
| 5,499,386 | * 3/1996 | Karlsson | 455/33.2 |
| 5,513,380 | * 4/1996 | Ivano et al. | 455/441 |
| 5,542,098 | * 7/1996 | Bonta | 455/33.2 |
| 5,548,806 | * 8/1996 | Yamaguchi et al. | 455/441 |
| 5,594,718 | * 1/1997 | Weaver, Jr. et al. | 370/331 |
| 5,603,081 | * 2/1997 | Raith et al. | 455/33.1 |
| 5,613,205 | * 3/1997 | Dufour | 455/33.2 |
| 5,640,677 | * 6/1997 | Karlsson | 455/33.2 |
| 5,647,291 | * 7/1997 | Tayloe | 370/332 |
| 5,903,840 | * 5/1999 | Bertacchi | 455/436 |
| 5,915,219 | * 6/1999 | Poyhonen | 455/435 |
| 6,006,093 | * 12/1999 | Aalto et al. | 455/443 |
| 6,091,955 | * 7/2000 | Aalto et al. | 455/447 |

* cited by examiner

Primary Examiner—Curtis Kuntz
Assistant Examiner—Binh K. Tieu
(74) Attorney, Agent, or Firm—Raymond J. Warren; Heather L. Creps

(57) ABSTRACT

A method of performing a handover as shown in FIGS. 2–3 for a mobile station in a multicellular environment including the steps of determining to handover from one of the plurality of microcells to the macrocell, performing handover from the one of the plurality of microcells to the macrocell; and sending a false neighbor list to the mobile station.

5 Claims, 3 Drawing Sheets

METHOD FOR HANDOVER IN MULTICELLULAR ENVIRONMENT

FIELD OF THE INVENTION

This invention relates in general to a communications system in a multicellular environment, and more particularly to a method for handover in a multicellular environment including an overlay and underlay of macrocells and microcells.

BACKGROUND TO THE INVENTION

In a cellular communication system, a service coverage area served by a base station is called a cell. In a multicellular or macrocellular environment, a larger cell, or macrocell, may be further divided into smaller cells, or microcells in order to increase capacity. An overlay of macrocells may be implemented over the same area that an underlay of microcells are implemented. Thus, a microcellular network includes a plurality of microcells which may be partially disposed within at least one macrocell. A mobile station may be located in an area that is serviced by both a macrocell and a microcell.

In some cellular communication systems it is sometimes desirable to have more than one layer of cells. A particular example is a layer of microcells (e.g. a cluster of small cells a few hundred meters in diameter or less) existing under an "Umbrella" of a much larger cell or cells, usually known as macrocells. Other examples might include (not exclusively) concentric cells where an area of coverage is divided into an inner region near to the base station site and an outer annular region further from the base site, with each region treated as separate cells. A further example is that of conventional cells versus "Supercells" where "Supercells" in GSM (Global System for Mobile Communications), terminology means cells which include coverage of communications ranges in excess of 35 Km from the base station, often used for rural or maritime coverage. Another term for this is "Extended Cells".

Having established a multi-layer cellular network, it is often necessary to direct certain mobile stations (or subscriber units) from one layer to another layer and to hold a mobile station in one layer or the other. It may further be desirable to accomplish this, even though the normal cell selection procedure would result in the mobile naturally selecting a cell layer other than the one desired by the revised system operation. A particular example is in microcell/macrocell networks, where it is desirable to direct fast moving vehicular subscribers to a wide area macrocell network and slow moving pedestrian subscribers to a small area microcell network. In such communications systems, there may be no mechanism in the network to do this as part of normal systems operation. A particular example is the GSM phase one networks, which did not anticipate microcellular operation and in which all mobile subscribers (fast moving and slow moving) select the strongest cell (which would usually be the nearest microcell).

EP-A-0589279 describes a microcellular communication system having microcells overlaid by macrocells.

Thus, it is desired to have a method to induce a mobile station to select the cell layer preferred for system operation and to maintain the mobile on that layer as required.

SUMMARY OF THE INVENTION

According to the present invention, there is provided a method of performing a handover of a mobile station in a multicellular environment having layers of cells containing at least one macrocell and a plurality of microcells at least partially disclosed in the at least one macrocell, the method characterised by the steps of: sending to the mobile station a neighbour list identifying cells associated with a layer to which the mobile station is to be handed off; and performing handover between the layers.

For a handoff from a microcell to a macrocell, the neighbour list sent to the mobile station only identifies cells associated with the macrocell, whereas for a handoff from a macrocell to a microcell, the neighbour list sent to the mobile station identifies cells associated with the macrocell and the microcell.

Exemplary embodiments of the present invention will now be described with reference to the accompanying drawings.

DETAILED DESCRIPTION OF THE PREFERRED EMBODIMENT

Figure 1:
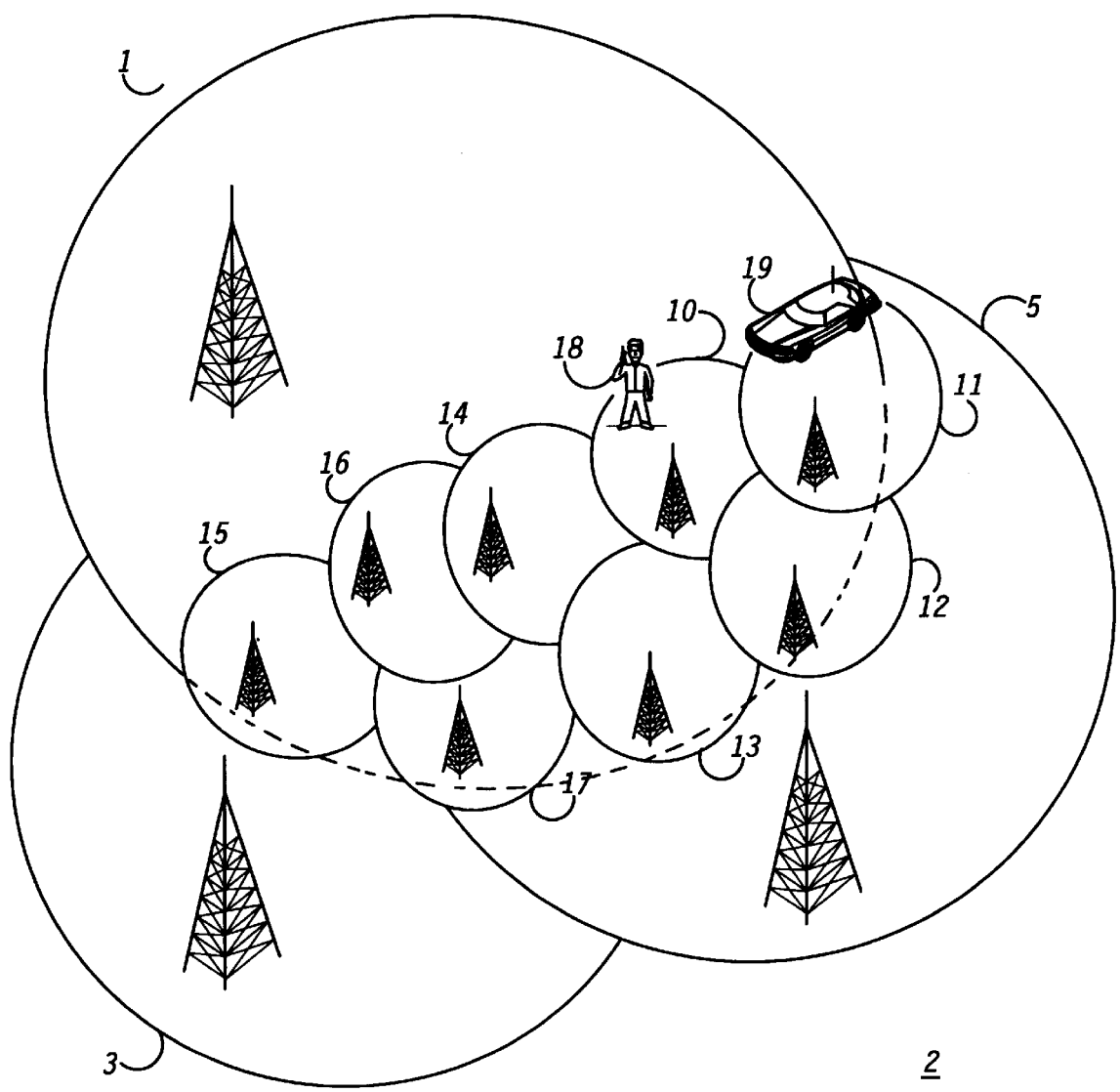
FIG. 1 illustrates a multicellular environment.

Referring to FIG. 1, a multicellular environment 2 is shown having at least one macrocell 1 wherein partially disposed in the macrocell 1 is a plurality of microcells 10–17. Each cell has a respective base station for communications with at least one mobile station. A fast moving mobile station 19 is shown being serviced by a macrocell 1 and a slow moving mobile station 18 is shown being serviced by a microcell 10.

In FIG. 1, may be further defined as showing a multicellular environment having at least one overlay layer including a plurality of macrocells 1, 3, 5 and an underlay layer including a plurality of microcells 10–17, the underlay layer of microcells is at least partially disposed within the overlay layer.

Figure 2:
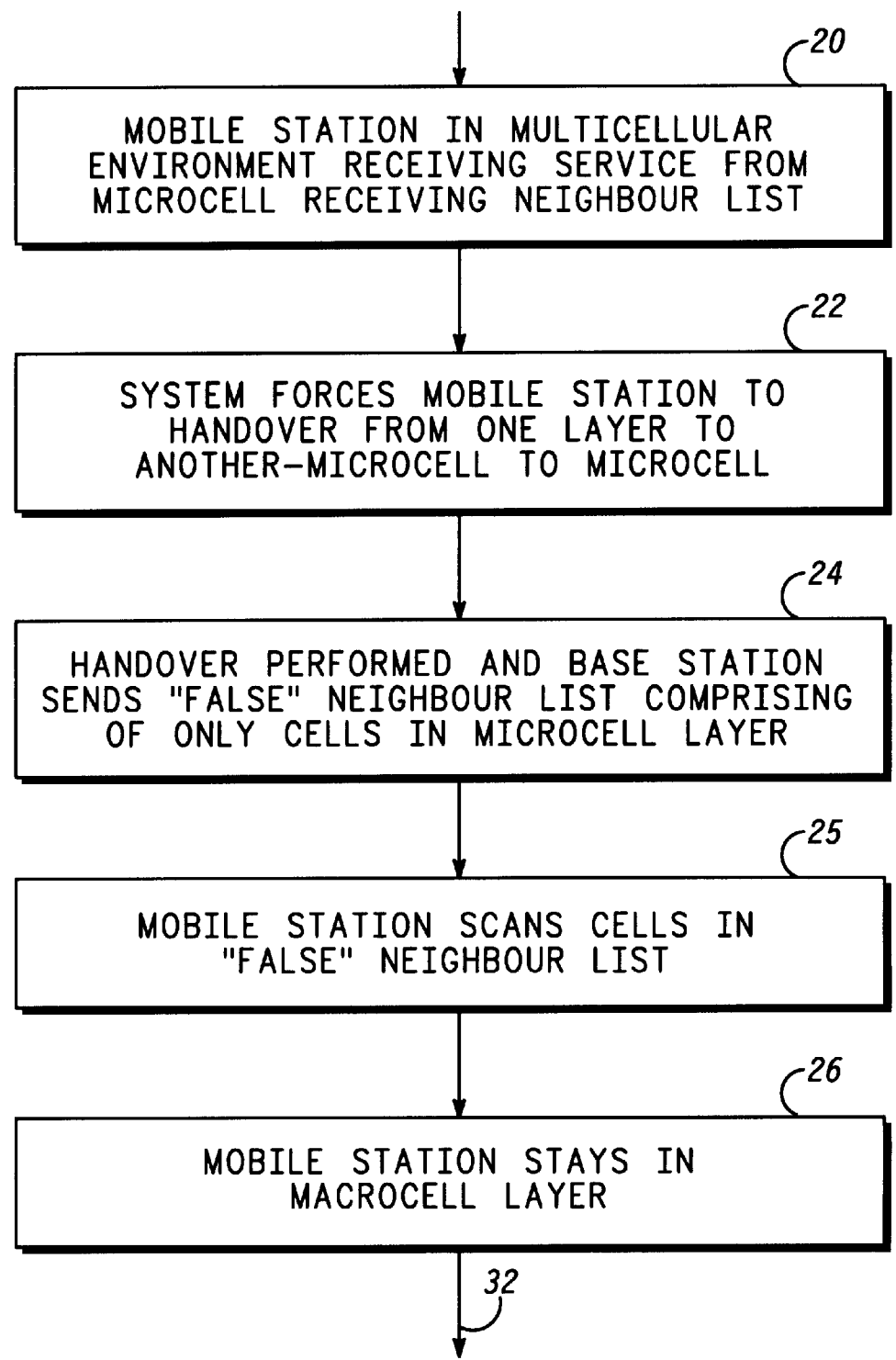
FIG. 2 is a flow chart for a method for preferred embodiment of the present invention.

FIG. 2 shows a method for performing a handover in the multicellular environment of FIG. 1. The method of the present invention includes inducing a mobile station to select a particular cell layer preferred for system operation and to maintain the mobile station on that layer as required.

A GSM mobile station while in idle mode (waiting to make or receive a call) will scan for the strongest base station signal strength and then send a brief signalling message to inform the base station infrastructure of its location, so that it can be paged if incoming calls arrive (location update). Also, while in idle mode, the mobile station receives broadcast messages from the base station on the Broadcast Control Channel (BCCH) containing a list of neighbour cells (BA list) programmed in by the Network Operator. The mobile station periodically scans the neighbour cells to determine whether any of the received signal strengths from them is stronger than the one it has selected. It is important to note that the mobile scans for no cells other than those in the last received BA list, unless it loses communication with its selected base station.

When in active communication either in a call or exchanging signalling messages, such as while performing a location update, the mobile station receives the same neighbour cell information (BA list) on the Slow Associated Control Channel (SACCH) rather than the Broadcast Control Channel. The SACCH is directly associated with the channel (frequency and timeslot) on which the mobile station and base station are communicating.

In a multilayer cellular network (e.g. an area covered by a macrocell overlay and a microcell underlay as shown in FIG. 1) the network planner will normally have designed the signal strengths from one layer to be greater than for the other layer (usually microcells would be the stronger). All mobile stations will select this layer and scan its designated neighbours.

Selected mobiles (e.g. those detected as being fast moving) can be directed from the stronger microcell layer to the weaker macrocell layer by invoking communication with the mobile station either on a traffic channel or a control channel (as referenced in PCT/EP95/03152 "Location Update Method" and assigned to the same assignee as the instant application) and then performing a handover. However, once sent to the weaker layer, they will immediately drop back to the stronger layer through the normal idle mode scanning procedure.

A preferred embodiment of the present invention as shown in FIG. 2 describes a method of holding a selected mobile station on a weaker layer or the above described macrocell layer.

In step 20, the mobile station 19 is receiving service from microcell 11 and receiving a neighbour list including the surrounding microcell base stations as well as possibly the neighbouring macrocells including the macrocell 1 that the mobile station 19 is also currently located in.

In step 22, the network requires the mobile station to handover from the microcell layer (microcell 11 of FIG. 1) to the macrocell layer (macrocell 1 of FIG. 1) by any handover decision method, including the one described in PCT/EP95/03152. However, it is contemplated by the present invention that a mobile station may also have the capability and proper information to decide to handover from the microcell layer to the macrocell layer.

In step 24, when the microcell layer base station is in the process of handing over the selected mobile station 19 to macrocell 1 of the macrocell layer, instead of sending the normal BA list (which would normally be the same list as sent to all other mobile stations on the BCCH and other SACCH's), the base station sends a "false BA list" on the specific SACCH, only to the selected mobile station 19. This "false BA list" only contains base station channels in the weaker macrocell layer.

By doing this, the base station deletes scanning information on the microcells or the microcell layer from the mobile station memory. The network operator also arranges that microcell layer base stations do not appear in the BA lists sent on the BCCH's and SACCH's of the macrocell layer base stations. The mobile station 19 therefore does not scan for microcell layer base stations and remains in the macrocell layer, as in steps 25–26.

The method above allows a selected mobile station to remain indefinitely in the macrocell layer once it is there, because no microcell layer base stations will appear in the neighbour lists.

However, it will often be desirable for certain mobiles to select the microcell layer from the macrocell layer. An example may be where pedestrian hand portables move through a macrocell region before arriving in the microcell region to which they should preferably be assigned.

Figure 3:
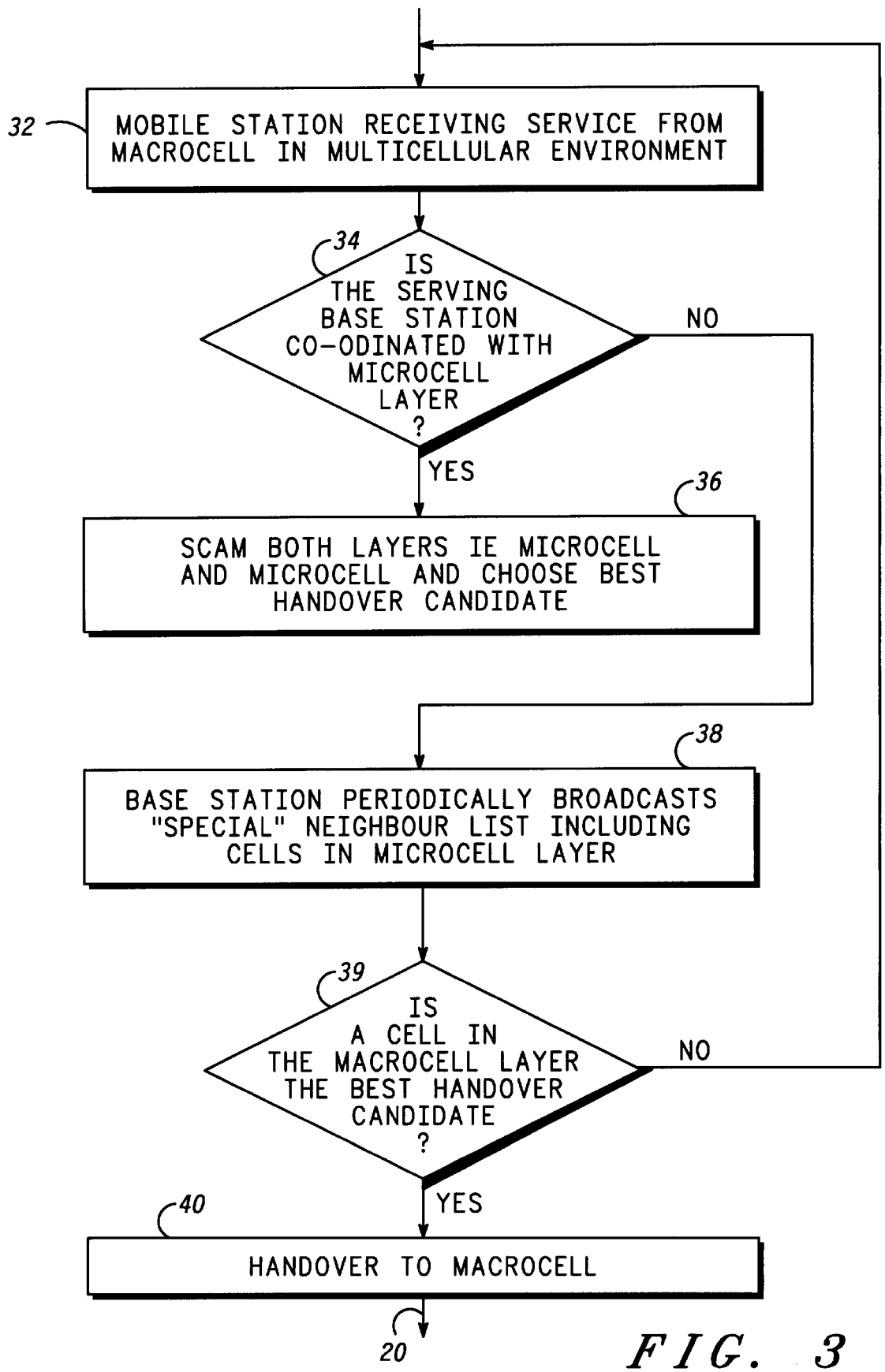
FIG. 3 is a flow chart for a method for an alternative embodiment of the present invention.

FIG. 3 shows an alternative embodiment of the present invention that allows a mobile station 18 to return to a microcell 11 in the microcell layer.

In step 32 the mobile station 18 is being serviced by macrocell 1. If it is determined, as in step 34, that the macrocell layer base station is coordinated with the microcell layer (i.e. it is controlled from the same Base Station Controller, or a co-operating or co-ordinated one) then a similar method can be employed. The selected macrocell layer base station communicates with the selected mobile station 18 and sends a "false BA list" which unlike its normal BA lists, contains base station frequencies in the microcell layer. This specific mobile station will then scan for base stations in both the macrocell layer and the microcell layer, and if a microcell layer base station is indeed stronger, it will select it, as in step 36.

If the macrocell layer is not co-ordinated by the microcell layer then the network operator arranges to periodically have the macrocell base station briefly send out a special or modified BA list, as in step 38, which unlike the normal ones, contains the microcell layer frequencies (e.g. periodically send this "modified BA list" for say 20 seconds every 5 to 30 minutes).

Mobile station 18 will then scan for the microcell layer at these times, and can be retained on the microcell layer once they have selected it as in steps 39 and 40.

If necessary, the mobile station can be returned to the macrocell layer or remain on the macrocell layer, in step 32 or according to the method of FIG. 2 above.

Although, the above description is in terms of microcell layers and macrocell layers any type of cell may be combined or considered in the different layers.

According to the present invention, a method is provided where a handover is performed for a mobile station from a microcell to a macrocell in a multicellular environment where the mobile station will select and stay on the layer that is desired. For example, fast moving mobile stations will pass through a macrocell before they see the "modified BA" list including the microcells, so they will never scan for the microcells. Pedestrian hand portables will remain on their selected macrocell base station long enough for them to see the "modified BA list" and hence will eventually seek the microcell network.

The present invention provides a method of efficiently performing handovers including allowing mobile stations to stay on desired cell layer in multicellular environments.

What is claimed is:

1. A method of performing a handover of a mobile station in a multicellular environment containing at least one macrocell and a plurality of microcells at least partially disposed in the at least one macrocell, the at least one macrocell being in a first layer, the plurality of microcells disposed in a second layer and the handover of the mobile station being between the first and second layers of the multicellular environment, the method comprising the steps of:

sending to the mobile station a neighbor list identifying cells associated with a layer to which the mobile station has been handed over, said neighbor list excluding neighbor cells belonging to a non-preferred layer, said neighbor list comprising different cells depending an which layer the mobile station is handing over to.

2. The method of performing handover according to claim 1, wherein a handoff from a microcell to a macrocell is further characterised in that the neighbour list sent to the mobile station only identifies cells associated with the macrocell.

3. The method of performing handover according to claim 1 or 2, wherein a handoff from a macrocell to a microcell is further characterised in that the neighbour list sent to the mobile station identifies cells associated with the macrocell and the microcell.

4. The method of performing handover according to claim 3, wherein the step of sending the neighbour list for a handoff from a macrocell to a microcell occurs periodically.

5. The method of performing handover according to any preceding claim, wherein a signal strength received at a mobile station when served in a microcell is relatievly stronger than a signal strength received at the same mobile station if alternatively served by the macrocell.

* * * * *

UNITED STATES PATENT AND TRADEMARK OFFICE
CERTIFICATE OF CORRECTION

PATENT NO. : 6,212,382 B1
DATED : April 3, 2001
INVENTOR(S) : Watson et al.

It is certified that error appears in the above-identified patent and that said Letters Patent is hereby corrected as shown below:

Column 4,
Line 55, reads "an", should be -- on --

Signed and Sealed this

Twenty-third Day of April, 2002

*Attest:*

JAMES E. ROGAN
*Attesting Officer*       *Director of the United States Patent and Trademark Office*